US011208349B2

(12) United States Patent
Ongarello et al.

(10) Patent No.: US 11,208,349 B2
(45) Date of Patent: Dec. 28, 2021

(54) MATERIAL PROVIDED WITH A STACK HAVING THERMAL PROPERTIES

(71) Applicant: SAINT-GOBAIN GLASS FRANCE, Courbevoie (FR)

(72) Inventors: Tommaso Ongarello, Le Plessisville-Robinson (FR); Julien Beutier, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/978,548

(22) PCT Filed: Mar. 6, 2019

(86) PCT No.: PCT/FR2019/050499
§ 371 (c)(1),
(2) Date: Sep. 4, 2020

(87) PCT Pub. No.: WO2019/171002
PCT Pub. Date: Sep. 12, 2019

(65) Prior Publication Data
US 2021/0017071 A1    Jan. 21, 2021

(30) Foreign Application Priority Data

Mar. 8, 2018 (FR) ...................... 1852033

(51) Int. Cl.
*B32B 15/04* (2006.01)
*C03C 17/36* (2006.01)

(52) U.S. Cl.
CPC ........ *C03C 17/3618* (2013.01); *C03C 17/366* (2013.01); *C03C 17/3639* (2013.01); *C03C 17/3644* (2013.01); *C03C 17/3652* (2013.01); *C03C 17/3668* (2013.01); *C03C 17/3681* (2013.01); *C03C 2217/256* (2013.01); *C03C 2217/70* (2013.01)

(58) Field of Classification Search
CPC .............. C03C 17/3618; C03C 17/366; C03C 17/3639; C03C 17/3644
USPC .......................... 428/428, 432, 434
See application file for complete search history.

(56) References Cited

U.S. PATENT DOCUMENTS 10,745,318 B2 * 8/2020 Lorenzzi ............. C03C 17/3681
10,815,147 B2 * 10/2020 Lorenzzi ............... C03C 17/366
(Continued)

FOREIGN PATENT DOCUMENTS

FR    2 985 724 A1    7/2013
FR    3 005 048 A1    10/2014
(Continued)

OTHER PUBLICATIONS

International Search Report as issued in International Patent Application No. PCT/FR2019/050499, dtaed May 28, 2019.

*Primary Examiner* — Lauren R Colgan
(74) *Attorney, Agent, or Firm* — Pillsbury Winthrop Shaw Pittman LLP

(57) ABSTRACT

A material includes a transparent substrate coated with a stack of thin layers including an alternation of three functional silver-based metallic layers. This material makes it possible to obtain a multiple glazing having good thermal performance results, in particular a selectivity greater than 2, excellent color neutrality and low optical sensitivity.

19 Claims, 1 Drawing Sheet

(56) References Cited

U.S. PATENT DOCUMENTS

| | | | |
|---|---|---|---|
| 2015/0004383 A1* | 1/2015 | Sandre-Chardonnal | ................... C03C 17/3655 428/213 |
| 2018/0194676 A1* | 7/2018 | Lorenzzi | ............. C23C 14/0652 |
| 2020/0239359 A1* | 7/2020 | Wanakule | ........... C03C 17/3639 |

FOREIGN PATENT DOCUMENTS

| WO | WO 2011/020974 A1 | 2/2011 |
|---|---|---|
| WO | WO 2011/147864 A1 | 12/2011 |
| WO | WO 2017/006027 A1 | 1/2017 |
| WO | WO 2017/006029 A1 | 1/2017 |

* cited by examiner

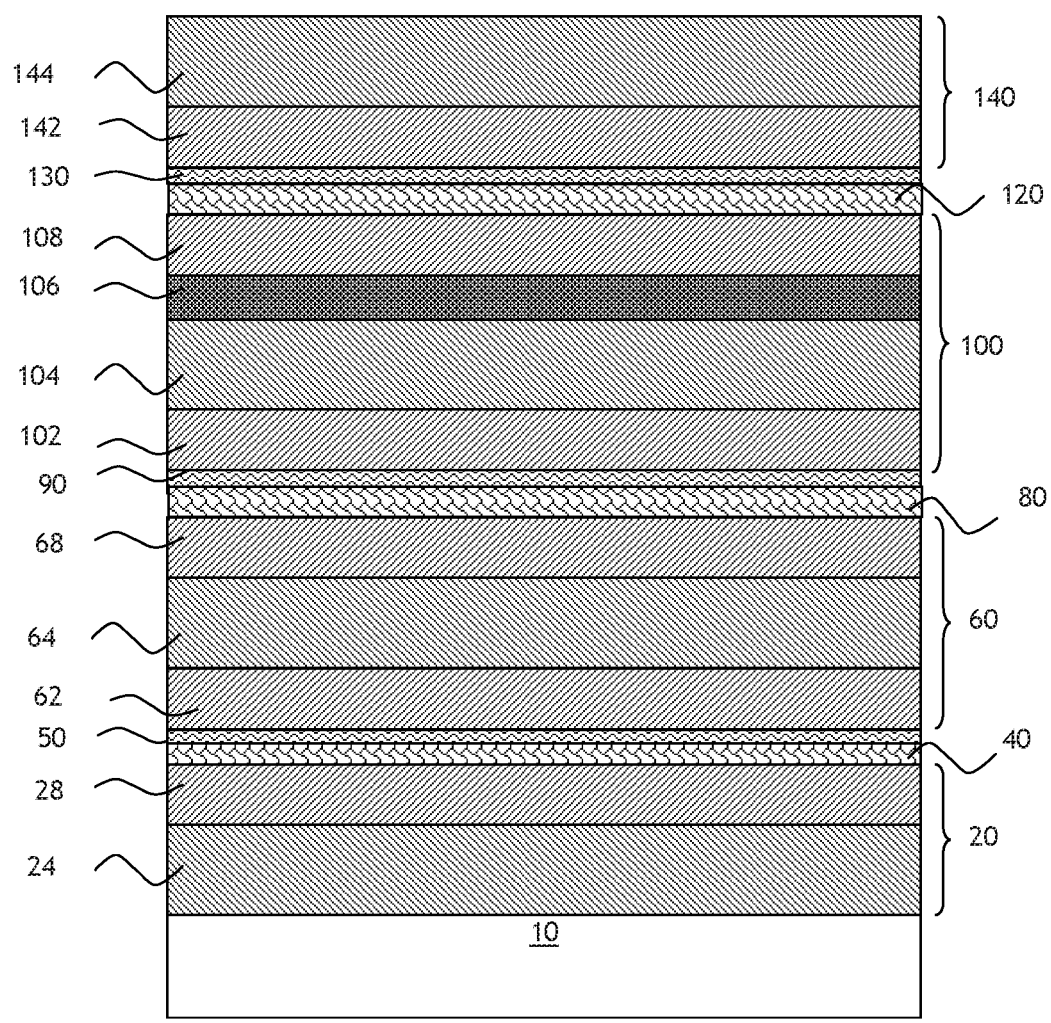

MATERIAL PROVIDED WITH A STACK HAVING THERMAL PROPERTIES

CROSS-REFERENCE TO RELATED APPLICATIONS

This application is the U.S. National Stage of PCT/FR2019/050499, filed Mar. 6, 2019, which in turn claims priority to French patent application number 1852033 filed Mar. 8, 2018. The content of these applications are incorporated herein by reference in their entireties.

The invention relates to a material comprising a transparent substrate coated with a stack of thin layers comprising several functional layers which can influence solar radiation and/or infrared radiation. The invention also relates to the glazings comprising these materials and also to the use of such materials for manufacturing thermal insulation and/or solar protection glazings.

These glazings may be intended to equip both buildings and vehicles, in particular with a view to reducing the air-conditioning load and/or preventing excessive overheating, known as "solar control" glazings, and/or reducing the amount of energy dissipated toward the outside, known as "low-e" glazings, driven by the ever increasing importance of glazed surfaces in buildings and vehicle passenger compartments.

One of the objectives of the invention is to develop a material which is both a "low-emissivity" and "solar control" material. To this end, the material or the glazing must be selective.

The selectivity "S" corresponds to the ratio of the light transmission $LT_{vis}$ in the visible region of the glazing to the solar factor SF of the glazing ($S=LT_{vis}/SF$). The solar factor "SF or g" corresponds to the ratio in % of the total energy entering the premises through the glazing to the incident solar energy.

Known selective glazings comprise transparent substrates coated with a stack of thin layers comprising three functional metallic layers, each placed between two dielectric coatings. Such glazings make it possible to improve solar protection while retaining a high light transmission. These stacks are generally obtained by a sequence of depositions carried out by sputtering, optionally assisted by a magnetic field.

These glazings are described as selective as they make it possible:
  to reduce the amount of solar energy penetrating inside the buildings while exhibiting a low solar factor (SF or g),
  to guarantee a high light transmission.

Another objective of the invention is to obtain an exceptionally neutral esthetic in external and internal reflection and in transmission. Conventionally, the known stacks target colors in external reflection in the range of blues or blue-greens.

"Colors in the blue-green range" correspond to negative values for a* and b* in the L*a*b* color measurement system. a* is between −10.0 and 0.0, preferably between −5.0 and 0.0 and b* is between −10.0 and 0.0, preferably between −5.0 and 0.0.

According to the invention, neutral tints in external reflection, in internal reflection or in transmission are defined by:
  values of a*, in ascending order of preference, of between −5 and +5, between −4 and +4, between −3 and +3, between −2 and +2, between −1 and +1;
  values of b*, in ascending order of preference, of between −5 and +5, between −4 and +4, between −3 and +3, between −2 and +2, between −1 and +1;

Stacks comprising three functional metallic layers are complex stacks. They comprise numerous layers of different natures and thicknesses deposited by sputtering on large substrates.

These large substrates are in particular flat glass substrates produced in the form of a continuous ribbon, for example a continuous ribbon of float glass or of cast glass. These "PLF" glass substrates (Large Format Glass Trays) are obtained directly by transverse cutting in the glass ribbon. These glass substrates therefore have at least one dimension, in general the width, corresponding to the width of the glass ribbon from which they originate. The other dimension, generally the length, corresponds to the length of cut ribbon. The "PLF" glass substrates typically have dimensions of 3.21 m by approximately 6 m.

During sputtering deposition, in particular on these large substrates, variations in thickness are sometimes observed for certain layers of the stack perpendicular to the running direction of the substrates (transverse uniformity). These variations can reach 5 to 10% of the desired thickness.

In addition, the same stacks are sometimes produced at two different production sites. For this, the intention is to best adjust the sputtering deposition parameters in order to obtain equivalent stacks. However, the adjustment of these parameters can also lead, for certain layers of the stack, depending on the production site, to variations in thickness which can reach 5 to 10% of the thickness.

However, the colorimetric characteristics of the known stacks comprising three functional metallic layers are sensitive to variations in thickness of this order (a few nanometers).

An objective of the invention is to provide a material with low optical sensitivity in external reflection. The term "low optical sensitivity" is intended to mean a small variation in the color in external reflection for a variation in the thicknesses of the layers making up the stack of the order of 5%.

All the light characteristics described are obtained according to the principles and methods of the European standard EN 410 relating to the determination of the light and solar characteristics of the glazings used in the glass for the construction industry.

Unless otherwise indicated, the colorimetric properties such as the values L*, a* and b* and all the values and ranges of values of the optical and thermal characteristics such as the selectivity, the external or internal light reflection, the light transmission, are calculated with:
  materials comprising a substrate coated with a stack fitted in a double glazing,
  the double glazing has a configuration: 6-16(Ar-90%)-4, that is to say a configuration consisting of a material comprising a substrate of the ordinary soda-lime glass type of 6 mm optionally coated with a stack and another glass substrate of the soda-lime glass type of 4 mm (uncoated); the two substrates are separated by an inserted gas-filled cavity comprising 90% of argon and 10% of air with a thickness of 16 mm,
  the stack is positioned on face 2.

The optical sensitivity ΔC in external reflection of a layer following a variation in thickness of 5% is defined as follows:
  A stack I of i layers each of geometric thickness ei is considered.
  The colorimetric values a* and b* in external reflection are determined for this stack.

Then, the thickness of the layer i is increased by 5% so as to form the layer (i+5%) of thickness e(i+5%). For example, for a layer i of geometric thickness ei of 20 nm, the thickness e(i+5%) is 21 nm.

For the stack I comprising, instead of the layer i, the layer (i+5%), the colorimetric values a*(i+5%) and b*(i+5%) in external reflection are determined.

The optical sensitivity is calculated.

The optical sensitivity (ΔCi) of a layer i is defined by the following equation:

$$\Delta C(\text{couche } i) = \sqrt{(\Delta a 5\%)^2 + (\Delta b 5\%)^2}$$

with Δa5%=|a*(i)−a*(i+5%)| and Δb5%=|b*(i)−b*(i+5%)| a*(i) and b*(i) corresponding to the values a* and b* in external reflection of the material fitted in a double glazing with the stack comprising the layer i of thickness ei fitted on face 2,
a*(i+5%) and b*(i+5%) corresponding to the values a* and b* in external reflection of the material fitted in a double glazing with the stack comprising the layer (i+5%) of thickness e(i+5%) fitted on face 2.

The optical sensitivity is measured at approximately 2°, that is to say with values a* and b* measured perpendicular to the glazing.

According to the invention, a low optical sensitivity ΔCi in external reflection of a layer i results in a value ΔCi of less than 5, preferably less than 4, and better still less than 3.

According to the invention, the stack comprising i layers has a low optical sensitivity in external reflection. This results in ΔCi values of less than 5, preferably less than 4, and better still less than 3, for all the i layers making up the stack having a thickness greater than equal to 10 nm, preferably for all the i layers making up the stack.

Among the layers of the stack, those which are most likely to generate high ΔCi values are the thickest layers in the range 10 to 100 nm, in particular the layers from 50 to 80 nm.

Depending on the composition of the stack and the thicknesses of the layers, the optical sensitivity of certain layers reaches values that are too high, which makes difficult:

uniform production with constant quality across the width of the PLF, the production of equivalent stacking on different production sites.

A stack with low optical sensitivity is easily adjustable and makes it possible to improve the quality of production. Conversely, when the optical sensitivity of the stack reaches values that are too high, a uniform production with constant quality over the width of the substrate is considered impossible, in particular in the case of a PLF substrate.

The complexity of the stacks comprising three functional layers makes it difficult to jointly obtain:

good thermal performance results, in particular a selectivity greater than 2, excellent color neutrality and low optical sensitivity.

The aim of the invention is thus to overcome these disadvantages by developing a substrate comprising a stack comprising at least three silver-based layers which exhibits a high selectivity, that is to say an LT/g ratio which is as high as possible for a given LT value, while guaranteeing excellent neutrality and low optical sensitivity.

The applicant has surprisingly discovered that by combining the use of three silver-based layers of increasing thickness and the choice of similar optical thicknesses for the two dielectric coatings closest to the substrate, and the use of blocking layers all of small thickness, a material is obtained which, when fitted in a double glazing, has a high selectivity, excellent color neutrality, but especially a low optical sensitivity.

Documents FR 3005048, WO 2017/006027, WO 2017/006029 and WO 2011/020974 describe substrates coated with a stack of thin layers comprising 3 functional silver-based layers placed between dielectric coatings.

The stacks described in document FR 3005048 comprise at least one thick blocking layer of more than 1.8 nm. The stacks described in document WO 2017/006027 comprise at least one thick blocking layer of more than 1.8 nm and/or comprise first and second dielectric coatings of very different optical thicknesses.

The stacks described in document WO 2017/006029 comprise first and second dielectric coatings of very different optical thicknesses.

Document FR2985724 describes substrates coated with a stack of thin layers comprising 4 functional silver-based layers placed between dielectric coatings.

The stacks described in document WO 2011/020974 comprise functional metallic layers of decreasing thickness. Comparative example 2 comprises first and second dielectric coatings of very different optical thicknesses.

Document WO 2011/147864 describes substrates coated with a stack of thin layers comprising 3 functional silver-based layers placed between dielectric coatings. The stacks also have absorbent layers. The first and second dielectric coatings have very different optical thicknesses.

A subject of the invention is a material as defined in claim 1. This material comprises a transparent substrate coated with a stack of thin layers successively comprising, from the substrate, an alternation of three functional silver-based metallic layers referred to as, starting from the substrate, first, second and third functional layers, the thicknesses of the functional metallic layers, starting from the substrate, increasing as a function of the distance from the substrate, and of four dielectric coatings referred to as, starting from the substrate, M1, M2, M3 and M4 which each have an optical thickness Eo1, Eo2, Eo3 and Eo4, each dielectric coating comprising at least one dielectric layer when the dielectric coatings comprise several dielectric layers; the optical thicknesses Eo1, Eo2, Eo3 and Eo4 are measured by adding the optical thickness of each dielectric layer constituting the dielectric coating.

Each functional metallic layer is placed between two dielectric coatings. The invention is notable in that:

the ratio of the thickness of the second functional metallic layer to the thickness of the first functional metallic layer Ag2/Ag1 is greater than or equal to 1.05, the ratio of the thickness of the third functional metallic layer to the thickness of the second functional metallic layer Ag3/Ag2 is greater than or equal to 1.05, the dielectric coatings M1 and M2 have optical thicknesses Eo1 and Eo2 of between 50 and 140 nm, the ratio of the optical thicknesses of the first and second dielectric coatings Eo1/Eo2 is between 0.80 and 1.20 including these values, preferably between 0.90 and 1.15, including these values the stack comprising at least one blocking layer located in contact with a functional metallic layer, the thickness of which is between 0.1 and 1.8 nm.

If the stack has several blocking layers, the thickness of each blocking layer is between 0.1 and 1.8 nm.

The at least one blocking layer is preferably located on a functional metallic layer.

Preferably, the stack of thin layers successively comprises, from the substrate, an alternation of only three functional silver-based metallic layers.

The presence of at least one blocking layer while limiting the blocking layer thickness in the stack makes it possible, in the configuration of the invention, to obtain a material which, when fitted in a double glazing, has high selectivity, excellent color neutrality and light transmission in the desired range.

The dielectric coatings M1 and M2 have, in ascending order of preference, an optical thickness ranging from 60 to 135 nm, from 70 to 130 nm, from 80 to 130 nm.

The choice of a fourth dielectric coating M4 of low optical thickness also contributes to obtaining the advantageous properties of the invention. The optical thickness of the fourth dielectric coating M4 is advantageously less than that of the first dielectric coating M1.

The ratio of the optical thicknesses of M4/M1 is, in ascending order of preference, less than or equal to 0.95, less than or equal to 0.90, less than 0.85.

The optical thickness of the fourth dielectric coating M4 is, in ascending order of preference, from 50 to 120 nm, from 60 to 100 nm, from 70 to 90 nm.

The material according to the invention, once fitted in a double glazing, with the stack positioned on face 2, makes it possible to obtain:
- a high selectivity, in particular greater than 1.8, or even greater than 2, and/or
- an internal and external light reflection of less than or equal to 20%, preferably of between 10% and 20%, and/or
- a light transmission of between 40 and 70%, preferably between 42 and 68%, or even between 45 and 60%, or between 50 and 60%, and/or
- a solar factor of 20 to 30%, and/or
- a solar factor, in ascending order of preference, of less than 30%, 29%, 28%.

The material according to the invention, once fitted in a double glazing, with the stack positioned on face 2, makes it possible to obtain a double glazing having:
  neutral tints in external reflection, and/or
  neutral tints in internal reflection, and/or
  neutral tints in transmission.

This results in colorimetric characteristics in external reflection, in internal reflection or in transmission defined by:
  values of a*, in ascending order of preference, of between −5 and +5, between −4 and +4, between −3 and +3, between −2 and +2, between −1 and +1;
  values of b*, in ascending order of preference, of between −5 and +5, between −4 and +4, between −3 and +3, between −2 and +2, between −1 and +1.

Obtaining neutral tints in internal reflection, in external reflection and in transmission is an objective of the invention.

The term "thin layer" is intended to mean a layer having a (physical) thickness of between 0.1 nm and 100 micrometers.

Conventionally, the refractive indices are measured at a wavelength of 550 nm.

Unless otherwise mentioned, the thicknesses discussed in the present document, without other information, are real or geometrical physical thicknesses denoted Ep and are expressed in nanometers (and not optical thicknesses). The optical thickness Eo is defined as the physical thickness of the layer under consideration multiplied by its refractive index at the wavelength of 550 nm: Eo=n*Ep. As the refractive index is a dimensionless value, it may be considered that the unit of the optical thickness is that chosen for the physical thickness.

According to the invention, a dielectric coating corresponds to a sequence of layers comprising at least one dielectric layer, located between the substrate and the first functional layer (M1), between two functional layers (M2 or M3) or above the last functional layer (M4).

If a dielectric coating is composed of several dielectric layers, the optical thickness of the dielectric coating corresponds to the sum of the optical thicknesses of the different dielectric layers constituting the dielectric coating.

If a dielectric coating comprises an absorbent layer for which the refractive index at 550 nm comprises an imaginary part of the non-zero (or non-negligible) dielectric function, for example a metallic layer, the thickness of this layer is not taken into account for the calculation of the optical thickness of the dielectric coating.

The light transmission (LT) of the substrates of ordinary soda-lime glass type, without stack, is greater than 89%, preferably of 90%

A glazing for the construction industry generally delimits two spaces: a space described as "exterior" and a space described as "interior". It is considered that the sunlight entering a building goes from the exterior toward the interior.

Conventionally, the faces of a glazing are denoted from the outside of the building and by numbering the faces of the substrates from the outside toward the inside of the passenger compartment or premises equipped therewith. This means that the incident sunlight passes through the faces in increasing numerical order.

The stack is either located:
  on face 2, that is to say on the outermost substrate of the building, on its face turned toward the inserted gas-filled cavity,
  on face 3, that is to say on the innermost substrate of the building, on its face turned toward the inserted gas-filled cavity, According to the invention, the light characteristics are measured according to the D65 illuminant at 2° perpendicularly to the material fitted in a double glazing (unless otherwise indicated):
LT corresponds to the light transmission in the visible region in %,
Rext corresponds to the external light reflection in the visible region in %, with the observer on the exterior space side,
Rint corresponds to the internal light reflection in the visible region in %, with the observer on the interior space side,
a*T and b*T correspond to the colors in transmission a* and b* in the L*a*b* system,
a*Rext and b*Rext correspond to the colors in reflection a* and b* in the L*a*b* system, the observer on the exterior space side,
a*Rint and b*Rint correspond to the colors in reflection a* and b* in the L*a*b* system, the observer on the interior space side, The invention also relates to:
the glazing comprising at least one material according to the invention,
the process for the preparation of a material according to the invention,
the use of a glazing according to the invention as solar control and/or low emissivity glazing for the building industry or vehicles, a building or a vehicle comprising a glazing according to the invention.

The invention also relates to a multiple glazing comprising at least one material according to the invention and at least one second substrate, the material and the second substrate are separated by at least one inserted gas-filled cavity. Preferably, the stack is positioned on face 2.

In a double glazing configuration, the present invention makes it possible to obtain a high selectivity S, in particular of greater than 1.8, indeed even of greater than 2, a solar factor (SF) of less than 30%, neutral colors in transmission and in external and internal reflection.

The preferred characteristics which appear in the remainder of the description are applicable both to the material according to the invention and, where appropriate, to the glazing, to the process, to the use, to the building or to the vehicle according to the invention.

The stack is deposited by magnetic-field-assisted sputtering (magnetron process). According to this advantageous embodiment, all the layers of the stack are deposited by magnetic-field-assisted sputtering.

The invention also relates to the process for obtaining a material according to the invention, wherein the layers of the stack are deposited by magnetron sputtering.

Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

For the purposes of the present invention, the labels "first", "second", "third" and "fourth" for the functional layers or the dielectric coatings are defined starting from the substrate carrying the stack and with reference to the layers or coatings having the same function. For example, the closest functional layer to the substrate is the first functional layer, the following moving away from the substrate is the second functional layer, and so on.

The invention also relates to a glazing comprising a material according to the invention.

The functional silver-based metallic layers comprise at least 95.0%, preferably at least 96.5% and better still at least 98.0% by weight of silver, relative to the weight of the functional silver-based metallic layer. The functional silver-based metallic layer preferably comprises less than 1.0% by weight of metals other than silver, relative to the weight of the functional silver-based metallic layer.

The thicknesses of the functional metallic layers starting from the substrate increase. The thickness of the third functional metallic layer is greater than that of the second functional metallic layer. The thickness of the second functional metallic layer is greater than that of the first functional metallic layer. The increase in thickness between two successive functional layers is greater than 0.8 nm, greater than 1 nm, greater than 2 nm, greater than 3 nm or greater than 4 nm.

According to advantageous embodiments of the invention, the functional metallic layers satisfy one or more of the following conditions:
  the ratio of the thickness of the second functional metallic layer to the thickness of the first functional metallic layer Ag2/Ag1 is between 1.05 and 2.30 including these values, between 1.06 and 2.10 or between 1.07 and 2.00 including these values, and/or
  the ratio of the thickness of the third functional metallic layer to the thickness of the second functional metallic layer Ag3/Ag2 is between 1.05 and 1.50 including these values, between 1.06 and 1.40 or between 1.07 and 1.30 including these values, and/or
  the ratio of the thickness of the third functional metallic layer to the thickness of the first functional metallic layer Ag3/Ag1 is between 1.15 and 2.50, between 1.20 and 2.30 or between 1, 30 and 2.20 including these values, including these values, and/or
  the thickness of the first functional metallic layer is between 6 and 14 nm, between 7 and 13 nm or between 8 and 12 nm, and/or
  the thickness of the second functional metallic layer is between 10 and 20 nm, between 11 and 18 nm or between 12 and 15 nm, and/or
  the thickness of the third functional metallic layer is between 12 and 20 nm, between 13 and 18 nm or between 15 and 17 nm, and/or
  the total thickness of the functional metallic layers is between 30 and 50 nm, including these values, preferably between 35 and 45 nm.

These ranges of thickness for the functional metallic layers are the ranges for which the best results are obtained for a light transmission in a double glazing of approximately 50% and a low solar factor. A high selectivity and neutral colors are thus obtained.

The stack may also comprise blocking layers located under the functional metallic layers. Preferably, on or under at least one functional metallic layer, and even more preferably the functional layer furthest from the substrate, does not have a blocking layer directly under it, in the direction of the substrate, in order to achieve light transmission in the desired range.

The blocking layers conventionally have the role of protecting the functional layers from possible damage during the deposition of the upper antireflective coating and during a possible high-temperature heat treatment of the annealing, bending and/or tempering type.

The blocking layers are chosen from metallic layers based on a metal or on a metal alloy, metal nitride layers, metal oxide layers and metal oxynitride layers of one or more elements chosen from titanium, nickel, chromium and niobium, such as a layer of Ti, TiN, TiOX, Nb, NbN, Ni, NiN, Cr, CrN, NiCr or NiCrN. When these blocking layers are deposited in metal, nitride or oxynitride form, these layers can undergo a partial or complete oxidation according to their thickness and the nature of the layers which frame them, for example, during the deposition of the following layer or by oxidation in contact with the underlying layer.

According to advantageous embodiments of the invention, the blocking layer or layers satisfy one or more of the following conditions:
  each functional metallic layer is in contact with at least one blocking layer chosen from a blocking underlayer and a blocking overlayer, and/or
  each functional metallic layer is in contact with a blocking overlayer, and/or
  the thickness of each blocking layer is preferably between 0.2 and 1.0 nm, and/or
  the total thickness of all the blocking layers in contact with the functional layers is between 0.5 and 5 nm, including these values, preferably between 1 and 3 nm, and/or
  the total thickness of all the blocking overlayers is less than 2.5, preferably less than 2.0, more preferably less than 1.4 nm, and/or the total thickness of all the blocking underlayers is between 0.1 and 1.2, preferably between 0.2 and 1.0 nm.

According to the invention, the blocking layers are considered not to be part of a dielectric coating. This means that their thickness is not taken into account in the calculation of the optical thickness of the dielectric coating located in contact with them.

According to advantageous embodiments of the invention, the dielectric coatings satisfy one or more of the following conditions in terms of thicknesses:

the dielectric coatings M1, M2, M3 and M4 each have an optical thickness Eo1, Eo2, Eo3 and Eo4 satisfying one or more of the following relationships: Eo4<Eo1, Eo4<Eo2, Eo1<Eo3, Eo2<Eo3, and/or the optical thickness of the first dielectric coating M1 is from 50 to 140 nm, from 60 to 135 nm, from 70 to 130 nm, from 80 to 130 nm, from 80 to 125 nm, 90 and 120 nm, and/or the physical thickness of the first dielectric coating M1 is from 25 to 65 nm, from 30 to 60 nm or from 35 to 55 nm, and/or the optical thickness of the second dielectric coating M2 is from 50 to 140 nm, from 55 to 125 nm, from 60 to 135 nm, from 70 to 130 nm, from 80 to 130 nm, from 80 to 125 nm, or from 90 to 125 nm, and/or the physical thickness of the second dielectric coating M2 is from 25 to 65 nm, from 30 to 60 nm or from 35 to 55 nm, and/or the optical thickness of the third dielectric coating M3 is from 140 to 200 nm, from 150 to 190 nm or from 160 to 180 nm, and/or the physical thickness of the third dielectric coating M3 is from 50 to 100 nm, from 55 to 90 nm, from 60 to 80 nm, and/or the optical thickness of the fourth dielectric coating M4 is from 50 to 120 nm, from 60 to 100 nm or from 70 to 90 nm, and/or the physical thickness of the fourth dielectric coating M4 is from 20 to 50 nm, from 25 to 45 nm, from 30 to 40 nm.

For the purposes of the present invention, the term "dielectric layer" should be understood as meaning that, from the viewpoint of its nature, the material is "nonmetallic", that is to say is not a metal. In the context of the invention, this term denotes a material exhibiting an n/k ratio over the entire wavelength range of the visible region (from 380 nm to 780 nm) equal to or greater than 5.

The dielectric layers of the coatings exhibit the following characteristics, alone or in combination:

they are deposited by magnetic-field-assisted sputtering, they are chosen from the oxides or nitrides of one or more elements chosen from titanium, silicon, aluminum, zirconium, tin and zinc, they have a thickness of greater than 2 nm, preferably of between 4 and 100 nm.

According to advantageous embodiments of the invention, the dielectric coatings satisfy one or more of the following conditions:

the dielectric layers can be based on an oxide or nitride of one or more elements chosen from silicon, zirconium, titanium, aluminum, tin, zinc, and/or the refractive indices of the dielectric layers are less than 2.30, preferably less than 2.20, and/or at least one dielectric coating comprises at least one dielectric layer having a barrier function, and/or each dielectric coating comprises at least one dielectric layer having a barrier function, and/or the dielectric layers having a barrier function are based on compounds of silicon and/or aluminum chosen from oxides, such as $SiO_2$ and $Al_2O_3$, silicon nitrides $Si_3N_4$ and AlN, and oxynitrides $SiO_xN_y$ and $AlO_xN_y$, based on zinc tin oxide or based on titanium oxide, the dielectric layers having a barrier function are based on compounds of silicon and/or aluminum and optionally comprise at least one other element, such as aluminum, hafnium and zirconium, and/or at least one dielectric coating comprises at least one dielectric layer having a stabilizing function, and/or each dielectric coating comprises at least one dielectric layer having a stabilizing function, and/or the dielectric layers having a stabilizing function are preferably based on an oxide chosen from zinc oxide, tin oxide, zirconium oxide or a mixture of at least two of them, the dielectric layers having a stabilizing function are preferably based on crystalline oxide, in particular based on zinc oxide, optionally doped using at least one other element, such as aluminum, and/or each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide.

Preferably, each dielectric coating consists solely of one or more dielectric layers. Preferably, there is thus no absorbent layer in the dielectric coatings, in order not to reduce the light transmission.

The dielectric layers can exhibit a barrier function. Dielectric layers having a barrier function (hereinafter barrier layer) is understood to mean a layer made of a material capable of forming a barrier to the diffusion of oxygen and water at high temperature, originating from the ambient atmosphere or from the transparent substrate, toward the functional layer. Such dielectric layers are chosen from the layers:

based on compounds of silicon and/or aluminum chosen from oxides such as $SiO_2$ and $Al_2O_3$, nitrides such as nitrides such as $Si_3N_4$ and AlN, and oxynitrides such as $SiO_xN_y$ or $AlO_xN_y$ optionally doped using at least one other element, based on zinc tin oxide, based on titanium oxide.

Preferably, each coating comprises at least one dielectric layer consisting:

of an aluminum and/or silicon nitride or oxynitride, or of a mixed zinc tin oxide, or of a titanium oxide.

These dielectric layers have a thickness:

of less than or equal to 40 nm, of less than or equal to 30 nm or of less than or equal to 25 nm, and/or of greater than or equal to 5 nm, of greater than or equal to 10 nm or of greater than or equal to 15 nm.

The stacks of the invention can comprise dielectric layers having a stabilizing function. For the purposes of the invention, the term "stabilizing" means that the nature of the layer is selected so as to stabilize the interface between the functional layer and this layer. This stabilization results in the strengthening of the adhesion of the functional layer to the layers which frame it and, in fact, it will oppose the migration of its constituent material.

The dielectric layer or layers having a stabilizing function can be directly in contact with a functional layer or separated by a blocking layer.

Preferably, the final dielectric layer of each dielectric coating located below a functional layer is a dielectric layer having a stabilizing function. This is because it is advantageous to have a layer having a stabilizing function, for example based on zinc oxide, below a functional layer as it facilitates the adhesion and the crystallization of the silver-based functional layer and increases its quality and its stability at high temperature.

It is also advantageous to have a layer having a stabilizing function, for example based on zinc oxide, above a functional layer in order to increase the adhesion thereof and to optimally oppose the diffusion on the side of the stack opposite the substrate.

The dielectric layer or layers having a stabilizing function can thus be above and/or below at least one functional layer or each functional layer, either directly in contact therewith or separated by a blocking layer.

Advantageously, each dielectric layer having a barrier function is separated from a functional layer by at least one dielectric layer having a stabilizing function.

The zinc oxide layer can optionally be doped using at least one other element, such as aluminum. The zinc oxide is crystalline. The layer based on zinc oxide comprises, in ascending order of preference, at least 90.0%, at least 92%, at least 95%, at least 98.0%, by weight of zinc, relative to the weight of elements other than oxygen in the layer based on zinc oxide.

Preferably, the dielectric coatings M1, M2 and M3 comprise a dielectric layer based on zinc oxide located below and directly in contact with the silver-based metallic layer.

The zinc oxide layers have, in ascending order of preference, a thickness:
  of at least 3.0 nm, of at least 4.0 nm, of at least 5.0 nm, and/or
  of at most 25 nm, of at most 10 nm, of at most 8.0 nm.

The stack of thin layers can optionally comprise a protective layer. The protective layer is preferably the final layer of the stack, that is to say the layer furthest from the substrate coated with the stack. These upper protective layers are regarded as included in the fourth dielectric coating. These layers generally have a thickness of between 2 and 10 nm, preferably 2 and 5 nm. This protective layer can be chosen from a layer of titanium, of zirconium, of hafnium, of zinc and/or of tin, this or these metals being in the metal, oxide or nitride form.

The protective layer can, for example, be chosen from a layer of titanium oxide, a layer of tin zinc oxide or a layer of titanium zirconium oxide.

A particularly advantageous embodiment relates to a substrate coated with a stack, defined starting from the transparent substrate, comprising:
  a first dielectric coating comprising at least one layer having a barrier function and one dielectric layer having a stabilizing function,
  optionally a blocking layer,
  a first functional layer,
  optionally a blocking layer,
  a second dielectric coating comprising at least one lower dielectric layer having a stabilizing function, one dielectric layer having a barrier function and one upper dielectric layer having a stabilizing function,
  optionally a blocking layer,
  a second functional layer,
  optionally a blocking layer,
  a third dielectric coating comprising at least one lower dielectric layer having a stabilizing function, one layer having a barrier function and one upper dielectric layer having a stabilizing function,
  optionally a blocking layer,
  a third functional layer,
  a blocking layer,
  a fourth dielectric coating comprising at least one dielectric layer having a stabilizing function, one dielectric layer having a barrier function, and
  optionally a protective layer.

The transparent substrates according to the invention are preferably made of a rigid inorganic material, such as made of glass, or are organic, based on polymers (or made of polymer).

The transparent organic substrates according to the invention, which are rigid or flexible, can also be made of polymer. Examples of polymers suitable according to the invention comprise, in particular:
  polyethylene;
  polyesters, such as polyethylene terephthalate (PET), polybutylene terephthalate (PBT) or polyethylene naphthalate (PEN);
  polyacrylates, such as polymethyl methacrylate (PMMA);
  polycarbonates;
  polyurethanes;
  polyamides;
  polyimides;
  fluoropolymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);
  photocrosslinkable and/or photopolymerizable resins, such as thiolene, polyurethane, urethane-acrylate or polyester-acrylate resins; and
  polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

According to a preferred embodiment, the substrate is made of glass, in particular soda-lime-silica glass, or of a polymeric organic substance.

The substrate advantageously has at least one dimension greater than or equal to 1 m, indeed even 2 m and even 3 m. The thickness of the substrate generally varies between 0.5 mm and 19 mm, preferably between 0.7 and 9 mm, in particular between 2 and 8 mm, indeed even between 4 and 6 mm. The substrate can be flat or bent, indeed even flexible.

The material, that is to say the substrate coated with the stack, can undergo a high-temperature heat treatment, such as an annealing, for example by a flash annealing, such as a laser or flame annealing, a tempering and/or a bending. The temperature of the heat treatment is greater than 400° C., preferably greater than 450° C. and better still greater than 500° C. The substrate coated with the stack can thus be bent and/or tempered.

The invention also relates to a glazing comprising at least one material according to the invention. The glazing of the invention can be in the form of a monolithic, laminated or multiple glazing, in particular double glazing or triple glazing.

In the case of a monolithic or multiple glazing, the stack is preferably deposited on face 2, that is to say that it is found on the substrate defining the exterior wall of the glazing and more specifically on the interior face of this substrate.

A monolithic glazing comprises 2 faces; face 1 is outside the building and thus constitutes the exterior wall of the glazing and face 2 is inside the building and thus constitutes the interior wall of the glazing.

A double glazing comprises 4 faces; face 1 is outside the building and thus constitutes the exterior wall of the glazing and face 4 is inside the building and thus constitutes the interior wall of the glazing, faces 2 and 3 being inside the double glazing.

In the same way, a triple glazing comprises 6 faces; the face 1 is outside the building (exterior wall of the glazing), the face 6 is inside the building (interior wall of the glazing) and the faces 2 to 5 are inside the triple glazing.

The glazing is preferably chosen from multiple glazings, in particular a double glazing or a triple glazing, comprising at least one material according to the invention and at least one second substrate, the material and the second substrate are separated by at least one inserted glass-filled cavity, said glazing producing a separation between an exterior space and an interior space.

According to advantageous embodiments, the glazing of the invention, in the form of a double glazing comprising the stack positioned on face 2, makes it possible in particular to achieve the following performance results:

a solar factor g of less than or equal to 30%, preferably less than or equal to 29%, and/or a light transmission, in ascending order of preference, of between 40% and 70%, preferably between 42 and 68%, or even between 50 and 60%, and/or a high selectivity, in ascending order of preference, greater than 1.8, at least 1.9, at least 2.0, and/or an external light reflection of less than or equal to 20%, preferably less than or equal to 18%, and/or an internal light reflection of less than or equal to 20%, preferably less than or equal to 18%, and/or neutral colors in external reflection with in particular, values of a* in external reflection comprised, in ascending order of preference, between −5 and +5, between −4 and +4, between −3 and +3, between −2 and +2, between −1 and +1, values of b* in external reflection comprised, in ascending order of preference, between −5 and +5, between −4 and +4, between −3 and +3, between −2 and +2, between −1 and +1.

Preferably, each layer i of the stack having a thickness of greater than equal to 10 nm has an optical sensitivity $\Delta C_i$ in external reflection of less than 5, preferably less than 4, and better still less than 3.

A laminated glazing comprises at least one structure of first substrate/sheet(s)/second substrate type. The stack of thin layers is positioned on one at least of the faces of one of the substrates. The stack can be on the face of the second substrate not in contact with the sheet, preferably polymer. This embodiment is advantageous when the laminated glazing is fitted in a double glazing with a third substrate.

These glazings are fitted to a building or a vehicle.

The applications of this invention relate to very selective solar control stacks with excellent color neutrality and low optical sensitivity in external reflection. This guarantees a neutral color in reflection and transmission. This solution is preferably intended for countries with hot climates.

The details and advantageous characteristics of the invention emerge from the following nonlimiting examples, illustrated by means of the appended FIGURE.

The proportions between the various components are not observed in order to make the figures easier to read.

FIG. 1 illustrates a stack structure comprising three functional metallic layers 40, 80, 120, this structure being deposited on a transparent glass substrate 10. Each functional layer 40, 80, 120 is positioned between two dielectric coatings 20, 60, 100, 140 so that:

the first functional layer 40 starting from the substrate is positioned between the dielectric coatings 20, 60, the second functional layer 80 is positioned between the dielectric coatings 60, 100, and the third functional layer 120 is positioned between the dielectric coatings 100, 140.

These dielectric coatings 20, 60, 100, 140 each comprise at least one dielectric layer 24, 28; 62, 64, 68; 102, 104, 106, 108; 142, 144.

Each dielectric coating 20, 60, 100 below a functional layer 40, 80, 120 comprises a final stabilizing layer 28, 68, 108 based on crystalline zinc oxide.

Each dielectric coating 60, 100, 140 above a functional layer 40, 80, 120 comprises a first stabilizing layer 62, 102, 142 based on crystalline zinc oxide.

Each dielectric coating 20, 60, 100, 140 comprises a dielectric layer having a barrier function based on silicon nitride, doped with aluminum, referred to here as $Si_3N_4$ 24, 64, 104, 144, or based on mixed zinc tin oxide 106.

The stack can also comprise:

blocking underlayers 30, 70 and 110 (not represented) located in contact with a functional layer, blocking overlayers 50, 90 and 130 located in contact with a functional layer, a protective layer (not represented).

EXAMPLES

I. Preparation of the Substrates: Stacks, Deposition Conditions and Heat Treatments Stacks of thin layers defined below are deposited on substrates made of clear soda-lime glass with a thickness of 6 mm.

In the examples of the invention:

the functional layers are silver (Ag) layers, the blocking layers are metallic layers made of alloy of nickel and of chromium (NiCr), the barrier layers are based on silicon nitride, doped with aluminum ($Si_3N_4$:Al) or based on mixed zinc tin oxide ($SnZnO_x$), the stabilizing layers are made of zinc oxide (ZnO).

The conditions for deposition of the layers, which were deposited by sputtering ("magnetron cathode" sputtering), are summarized in table 1.

TABLE 1

| | Target employed | Deposition pressure | Gas | n 550 nm |
|---|---|---|---|---|
| $Si_3N_4$ | Si:Al at 92:8% by weight | $3.2 \times 10^{-3}$ mbar | 55% Ar/(Ar + $N_2$) | 2.18 |
| ZnO | Zn:Al at 98:2% by weight | $1.8 \times 10^{-3}$ mbar | 63% Ar/(Ar + $O_2$) | 1.91 |
| $SnZnO_x$ | Sn:Zn (60:40% by weight) | $1.5 \times 10^{-3}$ mbar | 39% Ar—61% $O_2$ | 2.12 |
| TiZrO | $TiZrO_x$ | $2.4 \times 10^{-3}$ mbar | 90% Ar—10% $O_2$ | 2.32 |
| NiCr | Ni (80 at. %):Cr (20 at. %) | $2\text{-}3 \times 10^{-3}$ mbar | 100% Ar | — |
| Ag | Ag | $3 \times 10^{-3}$ mbar | 100% Ar | — |

At. = atomic

Table 2 lists the materials and the physical thicknesses in nanometers (unless otherwise indicated) of each layer or coating which forms the stacks as a function of their position with regard to the substrate carrying the stack (final line at the bottom of the table). The "Ref" numbers correspond to the references of FIG. 1.

TABLE 2

| | Ref. | Inv. 1 | Inv. 2 | Comp. 3 | Comp. 4 |
|---|---|---|---|---|---|
| DC: M4 | 140 | 37.7 | 40.4 | 39.6 | 58 |
| $Si_3N_4$ | 144 | 29.7 | 32.4 | 31.6 | 50 |
| ZnO | 142 | 8 | 8 | 8 | 8 |
| BL: NiCr | 130 | 0.3 | 0.5 | 0.55 | 1 |
| FL: Ag3 | 120 | 15 | 15.8 | 13 | 10 |
| BL: NiCr | 110 | 0 | 0 | 0 | 0 |
| DC: M3 | 100 | 79.8 | 86.4 | 78 | 98 |
| ZnO | 108 | 8 | 8 | 8 | 8 |
| SnZnO | 106 | 12 | 12 | 8 | 8 |
| $Si_3N_4$ | 104 | 51.8 | 54.4 | 54 | 74 |
| ZnO | 102 | 8 | 8 | 8 | 8 |
| BL: NiCr | 90 | 0.2 | 0.3 | 0.6 | 0.4 |
| FL: Ag2 | 80 | 12.3 | 14.9 | 10.8 | 11.8 |
| BL: NiCr | 70 | 0.1 | 0.1 | 0.1 | 0.1 |
| DC: M2 | 60 | 49.9 | 61 | 48 | 68.5 |
| ZnO | 68 | 8 | 8 | 8 | 8 |
| $Si_3N_4$ | 64 | 33.9 | 45 | 32 | 52.5 |
| ZnO | 62 | 8 | 8 | 8 | 8 |
| BL: NiCr | 50 | 0.3 | 1.1 | 1 | 1.9 |
| FL: Ag1 | 40 | 11.3 | 7.5 | 7 | 10 |
| BL: NiCr | 30 | 0.3 | 0.6 | 0.5 | 0.5 |
| DC: M1 | 20 | 45.3 | 54.8 | 67.5 | 43 |
| ZnO | 28 | 8 | 8 | 8 | 8 |
| $Si_3N_4$ | 24 | 37.3 | 46.8 | 59.5 | 35 |
| Substrate (mm) | 10 | 6 | 6 | 6 | 6 |

DC: Dielectric coating; BL: Blocking layer; FL: Functional layer.

The characteristics related to the thicknesses of the functional layers and of the dielectric coatings are summarized in table 3 below.

TABLE 3

| | Inv. 1 | | Inv. 2 | | Comp. 3 | | Comp. 4 | |
|---|---|---|---|---|---|---|---|---|
| DC | Ep | Eo | Ep | Eo | Ep | Eo | Ep | Eo |
| M1 | 45.3 | 96.6 | 54.8 | 117.3 | 67.5 | 145 | 43 | 91.5 |
| M2 | 49.9 | 104.5 | 61 | 128.7 | 48 | 100.3 | 68.5 | 145 |
| M3 | 79.8 | 169.6 | 86.4 | 175.3 | 78 | 165.7 | 98 | 209.3 |
| M4 | 37.7 | 80 | 40.4 | 85.9 | 39.6 | 84 | 58 | 124.2 |
| M2/M1 (Eo) | 1.08 | | 1.1 | | 0.69 | | 1.58 | |
| | M1 ≈ M2 | | M1 ≈ M2 | | M1 > M2 | | M1 < M2 | |
| M4/M1 (Eo) | 0.83 | | 0.73 | | 0.58 | | 1.36 | |
| | M1 > M4 | | M1 > M4 | | M1 > M4 | | M1 < M4 | |
| Ag2/Ag1 | 1.08 | | 1.99 | | 1.54 | | 1.18 | |
| Ag3/Ag2 | 1.21 | | 1.06 | | 1.20 | | 0.85 | |
| Ag3/Ag1 | 1.32 | | 2.10 | | 1.85 | | 1 | |
| Σ Ep BL | 1.2 | | 2.90 | | 2.75 | | 3.9 | |

DC: Dielectric coating; BL: Blocking layer; Ep: Physical thickness; Eo: Optical thickness.

II. "Solar Control" and Colorimetry Performance Qualities

The main optical characteristics measured when the glazings are part of a double glazing with a 6/16/4 structure: 6-mm glass/16-mm interlayer space filled with 90% of argon and 10% of air/4-mm glass 4 mm, the stack being positioned on face 2 (face 1 of the glazing being the outermost face of the glazing), are listed in table 4

TABLE 4

| | Target value | Inv. 1 | Inv. 2 | Comp. 3 | Comp. 4 |
|---|---|---|---|---|---|
| "g" % | ≤30% | 28 | 28 | 26.8 | 25 |
| "s" | >2.0 | 2.1 | 2.1 | 1.73 | 1.8 |
| LT % | 50-60% | 56 | 56 | 46.6 | 44 |
| a*T | $-4 < a^* < 4$ | -3 | -3 | -6 | 0 |
| b*T | $-4 < b^* < 4$ | -1 | -1 | -2.5 | 0 |
| LRext % | <20% | 15 | 15 | 18.8 | 16.5 |
| a*Rext | $-4 < a^* < 4$ | -2 | -2 | -0.2 | -2 |
| b*Rext | $-4 < b^* < 4$ | -2 | -2 | -6.5 | -5 |
| LRint % | <20% | 18 | 18 | 18.8 | 20 |
| a*Rint | $-4 < a^* < 4$ | -2 | -2 | -3 | -7 |
| b*Rint | $-4 < b^* < 4$ | -2 | -2 | -3 | -15 |

The glazings according to the invention simultaneously exhibit a solar factor of less than or equal to 30% and a selectivity of greater than 2.0. These glazings additionally exhibit an external and internal reflection at least less than 20%.

However, above all, these glazings are neutral in internal and external reflection and in transmission. Indeed, the values of a* and b* are all between −4 and 4, or even between −3 and 3.

For comparative example 3, the value of a* in transmission and the value of b* in external reflection are less than −4. In addition, for this example, the selectivity is too low.

For comparative example 4, the value of a* in internal reflection and the value of b* in external and internal reflection are less than −4. In addition, for this example, the selectivity is too low.

The proposed solution therefore makes it possible to have a solar factor of less than 30% while keeping a selectivity greater than 2.0 and an extremely neutral esthetic.

III. Determination of the Optical Sensitivity in External Reflection

The table below summarizes the values of optical sensitivity in external reflection of each layer of the stacks having a geometric thickness of greater than 10 nm.

TABLE 5

| | Ref. | Inv. 1 | Inv. 2 | Comp. 3 | Comp. 4 |
|---|---|---|---|---|---|
| M4: $Si_3N_4$ | 144 | 3.7 | 3.3 | 4.2 | 1.1 |
| FL: Ag3 | 120 | 2.7 | 2 | 2.3 | 0.5 |
| M3: SnZnO | 106 | 0.5 | 0.7 | — | |
| M3: $Si_3N_4$ | 104 | 3.8 | 1.8 | 2.3 | 5 |
| FL: Ag2 | 80 | 2.2 | 1.9 | 1.5 | 3 |
| M2: $Si_3N_4$ | 64 | 0.8 | 1.0 | 0.5 | 7 |
| FL: Ag1 | 40 | 2.2 | 1.1 | 0.2 | 3 |
| M1: $Si_3N_4$ | 24 | 2.2 | 2.1 | 4 | 2 |

According to the invention, a low optical sensitivity in external reflection of a stack comprising i layers results in ΔCi values of less than 5, preferably less than 4, and better still less than 3, for all the i layers making up the stack having a thickness greater than equal to 10 nm.

For the examples according to the invention all the ΔCi values are less than 4 and most are less than 3.

Comparative example 3 is not satisfactory because two ΔCi values are greater than or equal to 4. Added to this is the fact that the selectivity of this example is too low.

Comparative example 4 is not satisfactory because two ΔCi values are greater than or equal to 4, one of them being equal to 7. Added to this is the fact that the selectivity of this example is too low.

The proposed solution therefore makes it possible to simultaneously have high selectivity, excellent color neutrality and low optical sensitivity.

The invention claimed is:

1. A material comprising a transparent substrate coated with a stack of layers successively comprising, from the substrate, an alternation of three functional silver-based metallic layers referred to as, starting from the substrate, first, second and third functional metallic layers, thicknesses of the first, second and third functional metallic layers, starting from the substrate, increasing as a function of the distance from the substrate, and of four dielectric coatings referred to as, starting from the substrate, first dielectric coating M1, second dielectric coating M2, third dielectric coating M3 and fourth dielectric coating M4 which each have an optical thickness Eo1, Eo2, Eo3 and Eo4, respectively, each dielectric coating comprising at least one dielectric layer, in such a way that each functional metallic layer is placed between two dielectric coatings; each metallic layer can be placed above or below a blocking layer, or both, the stack comprising at least one blocking layer located in contact with a functional metallic layer, wherein:
a ratio of the thickness of the second functional metallic layer to the thickness of the first functional metallic layer Ag2/Ag1 is greater than or equal to 1.05,
a ratio of the thickness of the third functional metallic layer to the thickness of the second functional metallic layer Ag3/Ag2 is greater than or equal to 1.05,
the first and second dielectric coatings M1 and M2 each have a total optical thickness of between 50 and 130 nm, a ratio of the total optical thicknesses of the first dielectric coating M1 to the second dielectric coating M2 is between 0.80 and 1.15 including these values,
the thickness of each blocking layer is between 0.1 and 1.8 nm and a sum of thicknesses of all of the blocking layers is between 0.3 and 3.5 nm.

2. The material as claimed in claim 1, wherein the ratio of the optical thicknesses of the fourth dielectric coating M4 to the first dielectric coating M1 is less than or equal to 0.95.

3. The material as claimed in claim 2, wherein the ratio of the optical thicknesses of the fourth dielectric coating to the first dielectric coating is less than 0.85.

4. The material as claimed in claim 1, wherein the optical thickness Eo4 of the fourth dielectric coating M4 is from 50 to 120 nm.

5. The material as claimed in claim 4, wherein the optical thickness Eo4 of the fourth dielectric coating M4 is from 70 to 90 nm.

6. The material as claimed claim 1, wherein the three functional metallic layers satisfy the following characteristics:
the ratio of the thickness of the second functional metallic layer to the thickness of the first functional metallic layer Ag2/Ag1 is between 1.05 and 2.30, including these values, and/or
the ratio of the thickness of the third functional metallic layer to the thickness of the second functional metallic layer Ag3/Ag2 is between 1.05 and 1.50, including these values,
the ratio of the thickness of the third functional metallic layer to the thickness of the first functional metallic layer Ag3/Ag1 is between 1.15 and 2.50, including these values.

7. The material as claimed in claim 1, wherein one or more of the blocking layers are deposited above the functional layers and a total thickness of all the blocking layers above the functional layers is between 0.5 and 3.5 nm including these values.

8. The material as claimed in claim 1, wherein the stack comprises, starting from the substrate:
the first dielectric coating comprising at least one dielectric layer having a barrier function and one dielectric layer having a stabilizing function,
optionally a blocking layer,
the first functional metallic layer,
optionally a blocking layer,
the second dielectric coating comprising at least one lower dielectric layer having a stabilizing function, one dielectric layer having a barrier function and one upper dielectric layer having a stabilizing function,
optionally a blocking layer,
the second functional metallic layer,
optionally a blocking layer,
the third dielectric coating comprising at least one lower dielectric layer having a stabilizing function, one dielectric layer having a barrier function and one upper dielectric layer having a stabilizing function,
optionally a blocking layer,
the third functional metallic layer,
a blocking layer,
the fourth dielectric coating comprising at least one dielectric layer having a stabilizing function, one dielectric layer having a barrier function and
optionally a protective layer.

9. The material as claimed in claim 1, wherein, when the material is fitted in a double glazing with the stack positioned on face 2, the double glazing exhibits:
a selectivity of greater than 1.08,
an internal and external light reflection of less than 20%,
a light transmission of between 40 and 70%.

10. The material as claimed in claim 1, wherein, when the material is fitted in a double glazing with the stack positioned on face 2, the double glazing has the colorimetric characteristics in external reflection, in internal reflection or in transmission defined by:
values of a* of between −5 and +5;
values of b* of between −5 and +5.

11. The material as claimed in claim 10, wherein the values of a* is between −3 and +3, and the values of b* is between −3 and +3.

12. The material as claimed in claim 1, wherein the stack has values of optical sensitivity in external reflection ΔCi of less than 5 for all layers making up the stack having a thickness greater than equal to 10 nm.

13. The material as claimed in claim 3, wherein the first and second dielectric coatings M1 and M2 each have an optical thickness Eo1 and Eo2 from 70 to 130 nm.

14. The material as claimed in claim 1, wherein the stack has a value of optical sensitivity in external reflection ΔCi of less than 4 for each layer making up the stack having a thickness from 10 nm to 100 nm.

15. A glazing comprising at least one material as claimed in claim 1, wherein the glazing is in the form of monolithic, laminated or multiple glazing.

16. The glazing as claimed in claim 12, comprising the material and at least one second substrate, the material and the second substrate being separated by at least one inserted gas-filled cavity.

17. The multiple glazing as claimed in claim 15, wherein the glazing is a double glazing exhibiting, with the stack positioned on face 2:

a selectivity of greater than 1.8, an internal and external light reflection of less than 20%, a light transmission of between 40 and 70%, values of a* in external reflection comprised between −5 and +5, values of b* in external reflection comprised between −5 and +5.

18. The multiple glazing as claimed in claim 15, wherein each layer of the stack having a thickness of greater than equal to 10 nm has an optical sensitivity ΔCi in external reflection of less than 5.

19. The glazing as claimed in claim 15, wherein the glazing is a double glazing or triple glazing.

* * * * *